United States Patent [19]

Danler

[11] Patent Number: 4,632,321

[45] Date of Patent: Dec. 30, 1986

[54] AIR CONVEYOR FOR PLASTIC FILM

[75] Inventor: Richard Danler, Corvallis, Oreg.

[73] Assignee: Oerlikon Motch Corporation Div. Jetstream Systems Co., Hayward, Calif.

[21] Appl. No.: 745,289

[22] Filed: Jun. 14, 1985

Related U.S. Application Data

[63] Continuation of Ser. No. 577,432, Feb. 6, 1984, abandoned, Ser. No. 343,129, Jan. 27, 1982, abandoned, and Ser. No. 152,910, May 23, 1980, abandoned.

[51] Int. Cl.⁴ .............................................. B02C 23/18

[52] U.S. Cl. .................................... 241/62; 241/101.4; 264/37; 264/118

[58] Field of Search .......................... 241/3, 64, 101.4; 264/37, 118, 143, 144, DIG. 69; 406/88

[56] References Cited

U.S. PATENT DOCUMENTS 2,917,806 12/1959 Spence et al. .

4,144,618 3/1979 Campo et al. ...................... 19/161.1

*Primary Examiner*—Howard N. Goldberg

*Assistant Examiner*—Timothy V. Eley

*Attorney, Agent, or Firm*—Patrick J. Walsh

[57] ABSTRACT

An air conveyor for moving heavy gauge waste film from film producing equipment to a waste disposal unit wherein the air conveyor reduces the effective width of the film as it is moved to the disposal unit.

7 Claims, 17 Drawing Figures

10
12
14
16
17
18
20
22
24
26
28
32
34
36
38
40
42
44
46
48
50
52

32
46
46
56
60
46
46
58
52

54
60
58
60
56
51
60
58
60
54
46

54
60
58
60
56
60
58
60
54
46

54
60
56
60
58
60
58
60
54
46

54
60
56
60
60
60
54
46

22
12
70
76
74
30
46
72
14
8
4
7
6
5
54
58
56
60
32
24
36
38

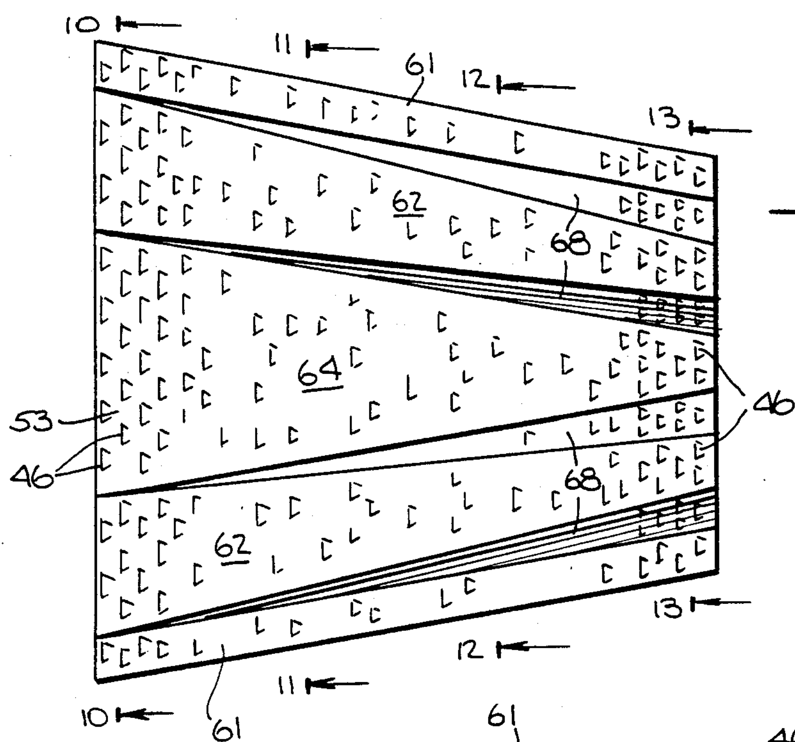
10
11
61
12
13
62
68
64
53
46
46
68
62
13
12
11
10
61
Fig. 9.
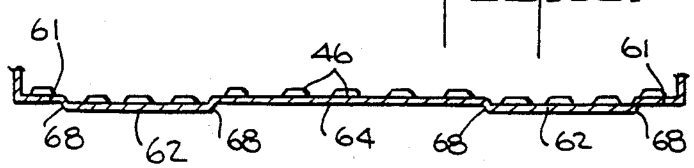
Fig. 10.
61
46
61
68
62
68
64
68
62
68
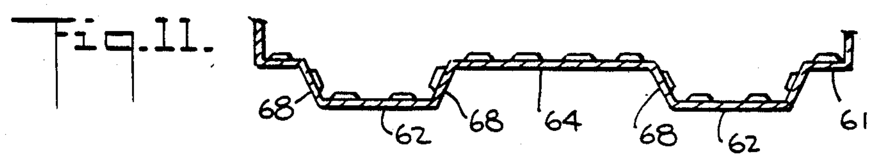
Fig. 11.
68
62
68
64
68
62
61
Fig. 12.
61
68
62
68
64
62
61
68
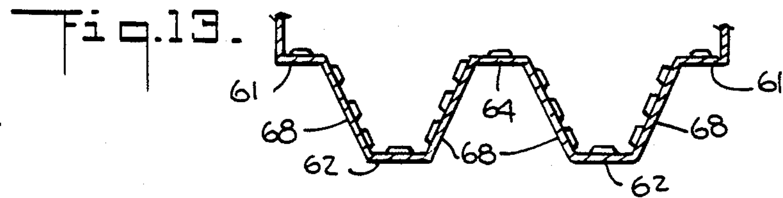
Fig. 13.
61
68
62
64
68
68
62
61
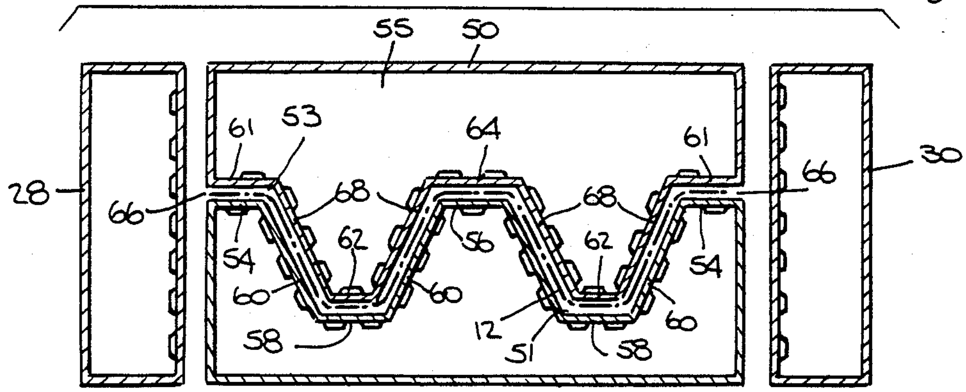
Fig. 14.
55
50
61
53
64
61
28
66
68
68
66
30
54
62
56
62
54
60
60
12
60
58
51
58

AIR CONVEYOR FOR PLASTIC FILM

This is a continuation of application Ser. No. 577,432 now abandoned filed Feb. 6, 1984 and a continuation of Ser. No. 343,129 now abandoned filed Jan. 27, 1982 and a continuation of Ser. No. 152,910 now abandoned filed May 23, 1980, now abondoned.

BACKGROUND OF THE INVENTION

The present invention is directed to an air conveyor for gathering waste film and conveying the film in web form to a convenient disposal unit such as a scrap grinding unit. A principal function of the air conveyor is to gather the film in manageable form for delivery to the scrap grinder.

In a typical manufacturing operation for fabricating heavy plastic film such as 7 to 15 mil Mylar, the plastic is extruded and drawn in web form through the fabricating equipment to windup rolls. During the course of manufacture, large quantities of scrap are generated which must be disposed of. In start-up operations, substandard film is usually formed as the forming equipment is brought to normal operating condition. In addition, during periods of normal manufacturing operation, the film web may break occasionally causing a massive pileup of waste film on the plant floor.

Air conveyors are known for disposing of relatively thin guage film which accumulates during a manufacting mishap. In such air conveyors, the film is moved and conveyed through the action of the conveyor air jets. However, stiffer or heavier film material of from 7 to 15 mils cannot be gathered or converged into convenient form for introduction into a scrap grinder. Heavy film behaves as does sheet metal, plywood, or cardboard in that they fold only in one dimension at a time and are not susceptible to forming compound bends without crinkling or creasing. Because heavy film creases or crinkles, it cannot be handled by an air conveyor of the type disclosed in the copending patent application.

At present therefore, thick scrap film is handled manually. Substandard waste film generated during startup operations is pulled aside and accumulated until normal film forming machine operation is achieved. Then the waste film is disposed of manually. Should the film web rupture during machine operation, the film forming equipment must be shut down while the scrap film is gathered and removed.

SUMMARY OF THE INVENTION

The present invention is directed to an air conveyor for removing waste or scrap heavy film material such as Mylar between approximately 7 to 15 mils. An air conveyor according to the present invention takes waste film in web form and reduces its effective width by a factor of up to 7 to 1 by forming a transverse generally uniform sinusoidal corrugation or pleat in the film. In this pleated form the waste film may be introduced into any suitable scrap disposal unit such as a scrap grinder to chipper for reprocessing.

In a preferred form, an air conveyor according to the invention includes an entrance section and a corrugating or pleating for conveying and pleating waste film. The entrance section of the conveyor comprises an air conveyor of known construction including a plenum chamber and a deck plate incised with slots arranged to issue jets of conveying air in the direction of conveyance. The conveyor is at least as wide as the web of waste film in order to obtain initial control of the film. The corrugating or pleating section of the conveyor cooperates with the entrance section to define a continuous conveying path for the film. The conveyor corrugating section comprises confronting nested conveyor surfaces which cooperate to impart a transverse generally sinusoidal curvature to the moving web. That is to say, the web enters the pleating section with its leading edge being in a generally straight line configuration and leaves with the leading edge in a generally sinusoidal curve. As a result of this transition in shape, the waste film web is reduced in width and is in a more convenient form for introduction into a film disposal unit.

The conveyor pleating section preferrably comprises upper and lower portions with their conveying surfaces being in confronting relation to each other and being spaced apart a gap sufficient to accommodate the travelling web. One of the conveyor portions has a surface which develops into two or more troughs each increasing in depth in the direction of conveyance as the conveyor converges toward its exit end. One or more ridges separate adjacent troughs so that a transverse cross-section of the exit end of the pleater is generally sinusoidal in form.

The other portion of the conveyor pleating section is similarly formed of troughs and ridges to give a generally sinusoidal transverse curve at the pleater exit end. The upper and lower portions are nested with each ridge of one lying along a trough of the other portion of the pleating section.

The over result then is a conveyor pleater section which receives a generally flat waste film web reforms the web to have a generally sinusoidal transverse curve so that as the web moves it is reduced in overall width.

It is to be understood that the deck plate surfaces of the trough and ridge portions of the pleating section are incised with slots for issuing conveying air jets for moving the film material.

The conveyor may be provided with one or more exit conveyor sections for preserving the sinusoidal form of the film as it moves to the waste disposal unit. The exit conveyor sections serve also to continue converging the pleated film after it leaves the film pleating section. Preferrably the exit conveyor has confronting air conveyor sections positioned along opposite sides of the pleated web and in converging relation to each other along the path of conveyance.

After leaving the exit conveyor section, the film is introduced into a scrap grinder or other disposal unit.

OBJECTS OF THE INVENTION

An object of the invention is to provide a conveyor capable of use in controlling and conveying waste film to a disposal unit.

Another object of the invention is to provide an air conveyor as part of a film-forming installation to enable removal of waste film generated during film forming operations.

Another object of the invention is to provide an air conveyor for removal of heavy guage film such as Mylar.

A further object of the invention is to provide an air conveyor which transforms generally flat heavy film into a convenient form for disposal by imposing a generally sinusoidal transverse curvature to the film as it is conveyed to a disposal unit.

Other and further objects of the invention will become apparent with an understanding of the description and drawing of the invention, or will occur to one skilled in the art upon employment of the invention in practice.

A preferred embodiment of the invention has been chosen for purposes of illustrating and describing the principles of the invention and is shown in the accompanying drawing in which.

Figure 2:
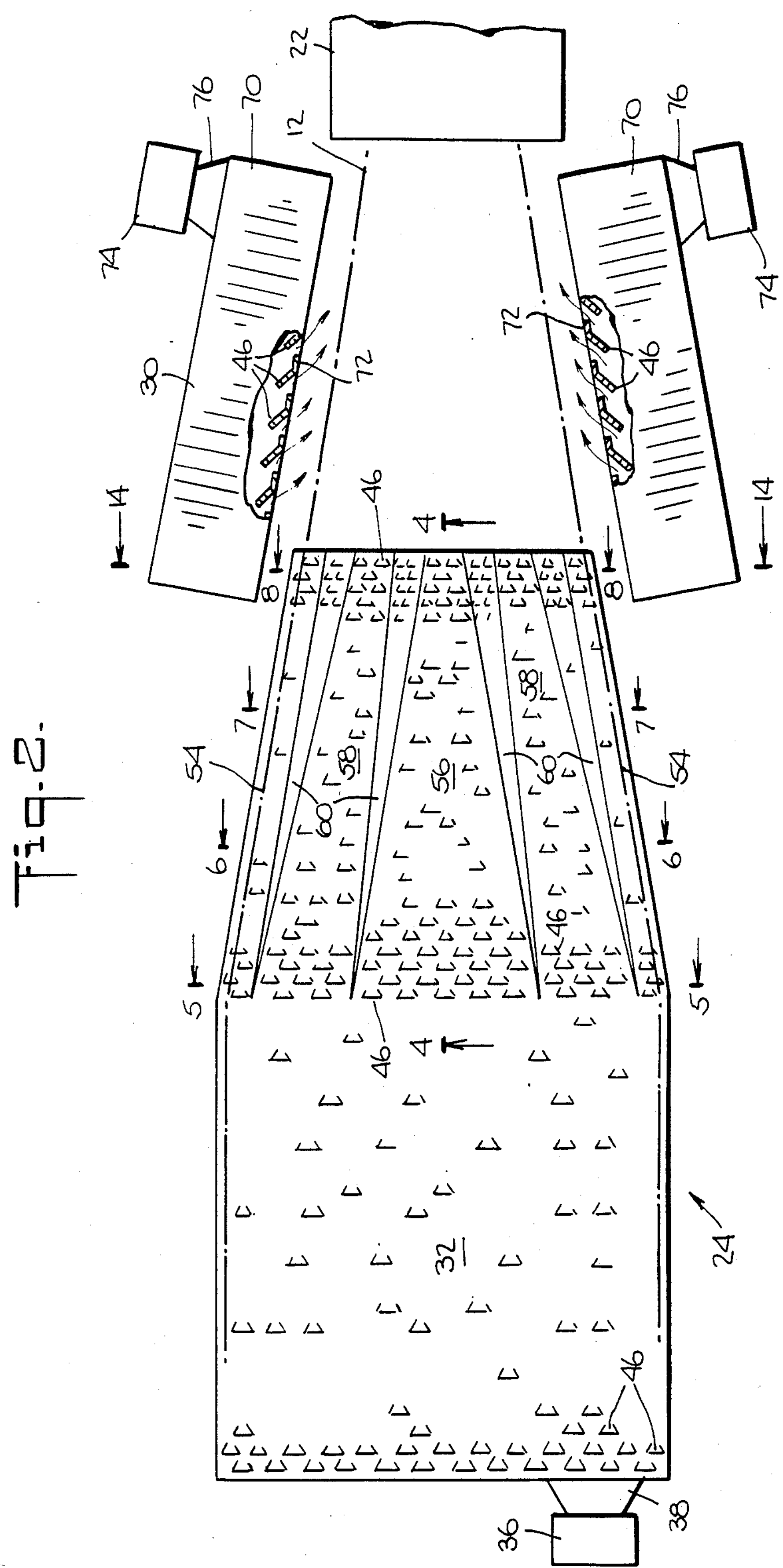
FIG. 2 is a plan view of the air conveyor portion of FIG. 1 with the top pleater unit removed.

FIGS. 5 through 8 are section views taken along lines 5—5 through 8—8 of FIG. 2 respectively, illustrating the surface contour of the lower pleater unit of the air conveyor.

FIG. 9 is a plan view of the deck plate surface of the top pleater unit.

FIGS. 10 through 13 are section views taken along lines 10—10 through 13—13 of FIG. 9 to illustrate the surface contour of the top pleater unit deck surface.

FIG. 14 is a section view taken along line 14—14 of FIG. 2 to illustrate the generally sinusoidal shape imparted to heavy film by the air conveyor.

Figure 16:
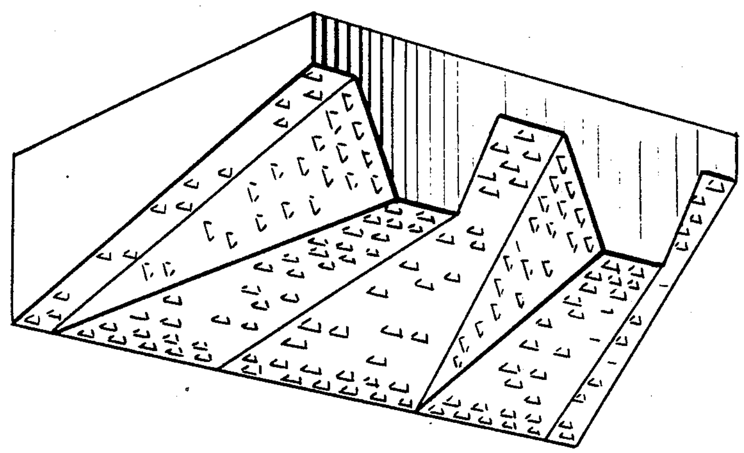
Figure 15:
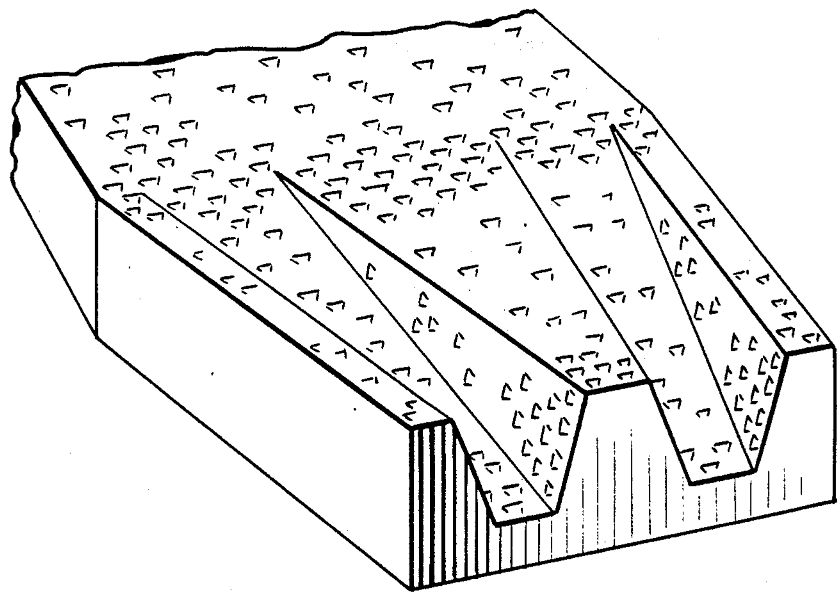

FIGS. 15 and 16 are perspective views of the lower and upper portions respectively of the pleater section of the air conveyor.

Figures 1, 3, 17:
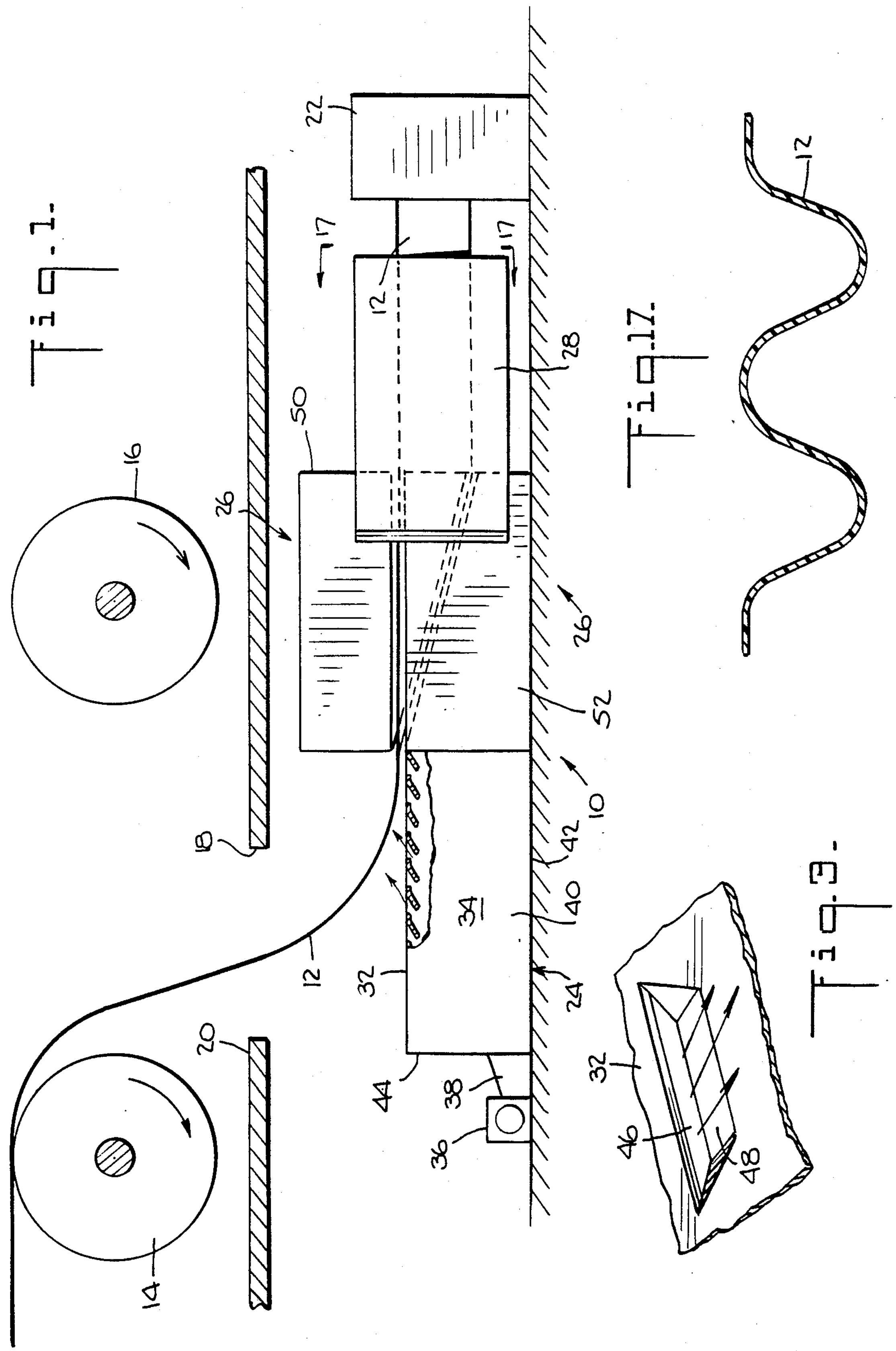
FIG. 1 is a schematic side elevation view, partly in section, showing an overall factory layout of an air conveyor for heavy film according to the invention.
FIG. 3 is a fragmentary perspective view of an air slot incised into the air conveyor deck plate surface for issuing conveying air jets.

FIG. 17 is a section view taken along line 17—17 of FIG. 1 to show the generally sinusoidal contour assumed by heavy film as it enters the film chipper.

Referring now to the drawing and in particular to FIG. 1, a heavy film air conveyor 10 of the invention is intended primarily for use in a factory for producing heavy film 12 such as Mylar of between 7 and 15 mils in thickness which is formed and drawn over a support roll 14 to a windup roll 16. As noted above, large amounts of waste film are generated during startup operations, and occasionally during a production run when the film web ruptures. In practice, air conveyor 10 is positioned below a suitable opening 18 in the factory floor 20 in order to capture and convey waste film to a film chipper or grinder 22. The air conveyor may be oriented horizontally as shown, or if desired it may be oriented vertically or at an incline.

The air conveyor includes an entrance section 24 preferably at least as wide as the film being conveyed. The entrance section captures the leading edge portion of the film, carries it through a pleater section 26, through converging side panels 28, 30, and into the film chipper 22. As the film is moved it changes shape from a flat sheet to the generally sinusoidal transverse form shown in FIG. 17.

The conveyor entrance section comprises an air conveyor having a perforated deck plate 32, a plenum chamber 34, and air fan or blower 36 for supplying pressurized air through a transition duct 38 to the plenum chamber. The plenum chamber is fully enclosed and defined by side 40, bottom 42, and end walls 44, and deck plate 32. The deck plate defines the conveying surface of the conveyor and is perforated with air slots 46 which emit jets of conveying air indicated by arrows. Each air jet has a major conveying component along the surface of the deck plate. The air slots 46 are incised into the deck plate as shown in FIG. 3 by cutting the deck plate 32 and depressing the downstream portion 48 of the deck plate to define air jet slot 46.

At the outset it should be understood that the deck plate surfaces of the entrance section 24, the pleater section 26, and the side panels 28, 30 all have surfaces perforated with air sots of the configuration shown in FIG. 3.

Waste film 12 generated during film forming operations moves through floor opening 18 and is captured by the entrance section 24 of the air conveyor. According to the invention, the film is converged through the pleater section 26 and side panels 28, 30 of the conveyor and is reduced in width for feeding into the film chipper 22.

The pleated section 26 of the air conveyor preferably comprises upper 50 and lower 52 portions which cooperate to transform the film from a relatively flat condition in which the leading edge approximates a straight line (in edge view) to a generally sinusoidal condition in which the film leading edge takes on the wave form shown in FIG. 17. This change in form reduces the film width and facilitates introduction of the film into the film chipper 22.

Figure 4:
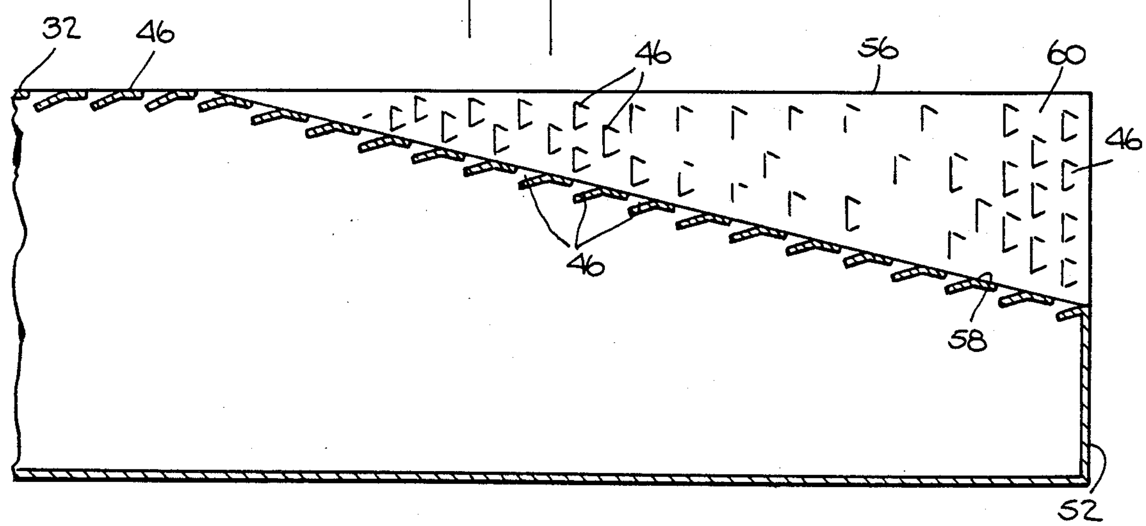
FIG. 4 is a section view taken along line 4—4 of FIG. 2 showing the incline of a trough portion of the lower pleater unit of the air conveyor.
Figure 5:
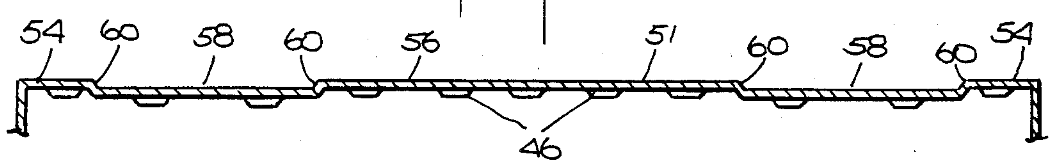
Figure 6:
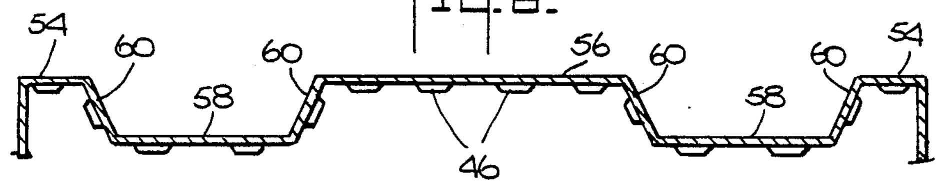
Figure 7:
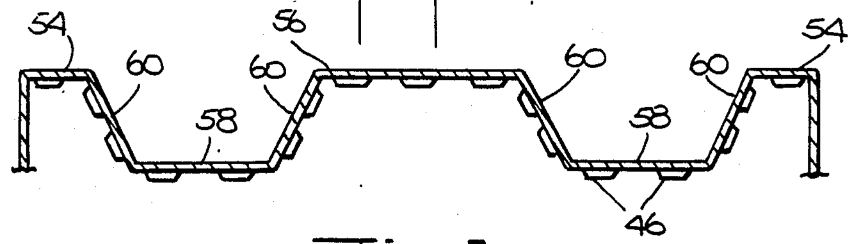
Figure 8:
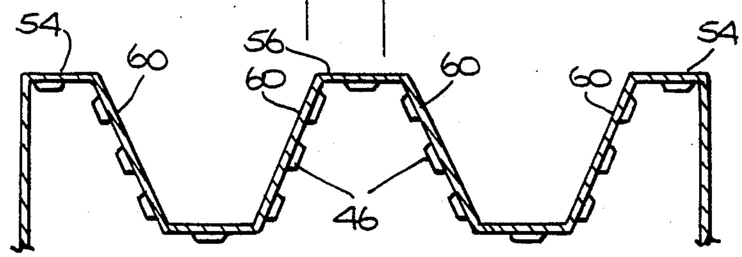

The lower unit 52 of the pleater has a generally "W"-shaped cross-section with the "W"-shape developing in depth and convergence in the conveying direction in manner illustrated in FIGS. 5–8. That is to say, the lower pleater unit 52 includes marginal ridges 54 following the angle of convergence of the pleated section and a central ridge 56 converging in the direction of conveyance. Each of the marginal and central ridges are coplanar with the deck plate surface of the entrance section of the conveyor. The marginal and central ridges are separated by intervening troughs 58 which also converge in the conveying direction. In addition, each trough is inclined in the conveying direction as shown in FIG. 4.

Adjacent ridges 54, 56 and troughs 58 are separated by wedge-shaped gussets 60 which become wider in the direction of conveyance so as to connect contiguous ridge and trough surfaces.

The surfaces of ridge, gusset and trough define an active conveying surface 51 perforated with air slots 46 for issuing air jets in the direction of conveyance. If desired the marginal ridges may have air jets oriented to issue air jets in the direction of convergence. The overall effect of air jets in the pleater section is to move the film in the conveying direction so that it assumes a "W"-shape or generally sinusoidal transverse shape for convenient entry into the film chipper.

As best shown in FIGS. 1 to 9 through 16, the pleater section includes an upper unit 50 having an active air conveyor surface 53 formed with ridges 62 and trough 64 arranged to nest with the active surface of the lower pleater unit in forming a "W"-shaped gap 66 (FIG. 14) for pleating the film 12. The upper unit includes a plenum chamber 55 supplied with pressurized air in the same manner as the lower unit 52. As shown in FIGS. 9–13, the upper active surface includes marginal ridges 61, converging ridges 62 and trough 64 which converge in the manner illustrated in FIGS. 10–13 and 16. Gussets 68 join adjacent ridge and trough surfaces of the upper active surface 53. The entire active surface 53 is incised with air slots 46 substantially in the same manner as the active surface of the lower unit.

The upper 50 and lower 52 units of the pleater are shown in FIGS. 15 and 16. It will appear that the pleater units 50 and 52 converge in the direction of conveyance and have active ridge and trough surfaces for pleating film. The upper and lower pleater units nest to define a generally uniform gap for corrugating the film. The entire deck plate surfaces of the upper and lower pleater units are perforated with air slots 46 for issuing air jets to convey and converge the film in a generally sinusoidal curve.

As is preferred, a pair of side panels 28, 30 lie in confronting convering relation along the line of conveyance between the pleater 26 and the chipper 22 to further squeeze the film 12. Each side panel includes a plenum chamber 70 and a perforated deck plate 72. Each plenum chamber is supplied with pressurized air by means of an air blower 74 through a transition duct 76. Each deck plate is incised with air slots 46 as shown in FIG. 3 for issuing air jets along the deck plate surface. The side panels continue squeezing or converging the sinusoidal shape film after it emerges from the pleater section and as it approaches the chipper.

It is to be understood that the heavy film air conveyor of the invention may be oriented horizontally, vertically or at any intermediate incline. The air conveyor may be used with or without the upper pleater unit.

In one use of the invention, 14 mil film was converged by a ratio of approximately 5 to 1 omitting the upper pleater unit and with 2" W.G. air pressure in the entrance and pleater sections and with 3" W.G. in the side panels.

In another use including the upper pleater unit with a gap of 6 inches between pleater units, a convergence ratio of 7 to 1 was obtained for 14 mil film using the same plenum air pressures as the earlier example.

In each case the air velocity issuing from the air jets is much higher than film speed so that the air conveyor exerts sufficient pull on the film to avoid film jamming the conveyor during use.

I claim:

1. An air conveyor for conveying plastic scrap film comprising: an entrance section at least as wide as the film being conveyed, said entrance section having a perforated deck plate and a plenum chamber cooperating to generate air jets for moving the film along the perforated deck, means for supplying pressurized air to said plenum chamber, a pleater section comprising confronting air conveyor sections having deck plate surfaces defining a generally sinusoidal gap therebetween positioned over and under said film web for conveying and reducing the width of the film as it is conveyed, the deck plate surfaces being nested W-shaped surfaces, and means for grinding the film.

2. An air conveyor for conveying plastic film web of predetermined width and indeterminate length comprising an entrance section having a width at least as wide as the film being conveyed, said entrance section comprising a deck plate having slots oriented to issue air jets for conveying the film along the entrance section, a pleater section located downstream of said entrance section, said pleater section comprising air conveyor sections positioned over and under said film web, said over and under sections each having W-shaped deck surfaces in nested confronting relationship to define a gap therebetween having a generally sinusoidal profile extending transversely of the film, each of said W-shaped deck surfaces having slots therein for issuing conveying air jets in the direction of conveyance, means for supplying air under pressure to both the entrance and pleater sections of the air conveyor whereby the air conveyor reduces the width of the film by imparting a generally sinusoidal shape thereto.

3. An air conveyor as defined in claim 2 in which each of said W-shaped deck surfaces comprises at least two troughs separated by a ridge member and durther in which the ridge members of one pleated deck surface lie along the trough portion of the other pleater deck section thereby to define the generally sinusoidal profile of said gap.

4. An air conveyor as defined in claim 3 in which the troughs of the pleated deck surfaces increase in depth as said deck surfaces extend in the direction of conveyance.

5. An air conveyor as defined in claim 2 which further includes confronting air conveyor sections positioned on opposite sides of the film for guiding, conveying, and converging the film as it leaves the pleater section.

6. An air conveyor as defined in claim 5 in which the film is reduced in width by a factor of 7:1 between entrance and exit sections of the conveyor.

7. An air conveyor as defined in claim 5 in combination with a grinder for receiving the film as it leaves the conveyor.

* * * * *